No. 881,096. PATENTED MAR. 3, 1908.
J. H. CROSKEY.
GLASS GATHERING APPARATUS.
APPLICATION FILED MAY 7, 1906.

4 SHEETS—SHEET 1.

Witnesses:
E. R. Rodd.
Chas. S. Lepley.

Inventor
John H. Croskey
by C. M. Clarke
his attorney

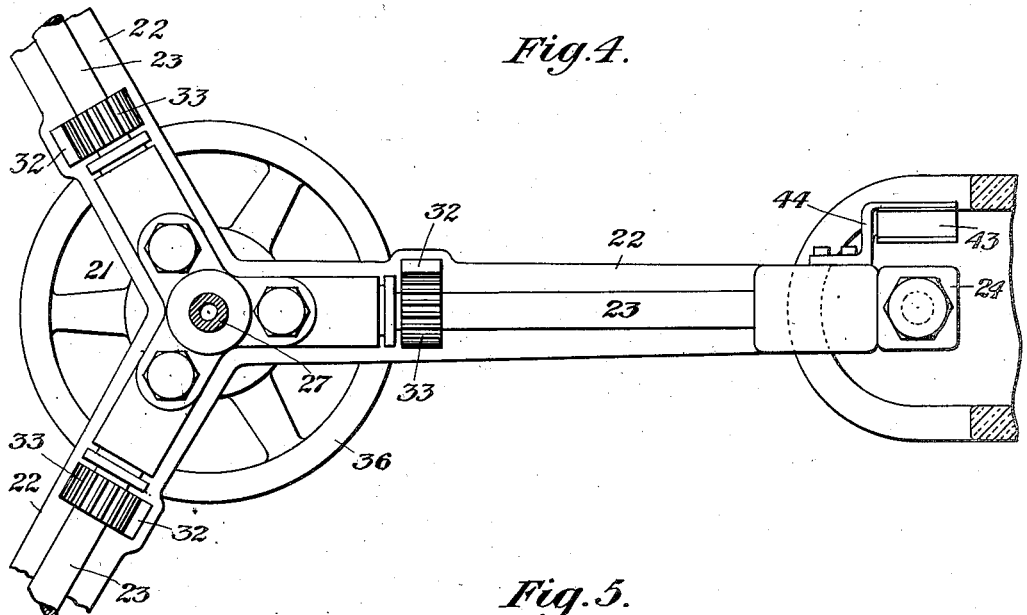
Fig. 4.
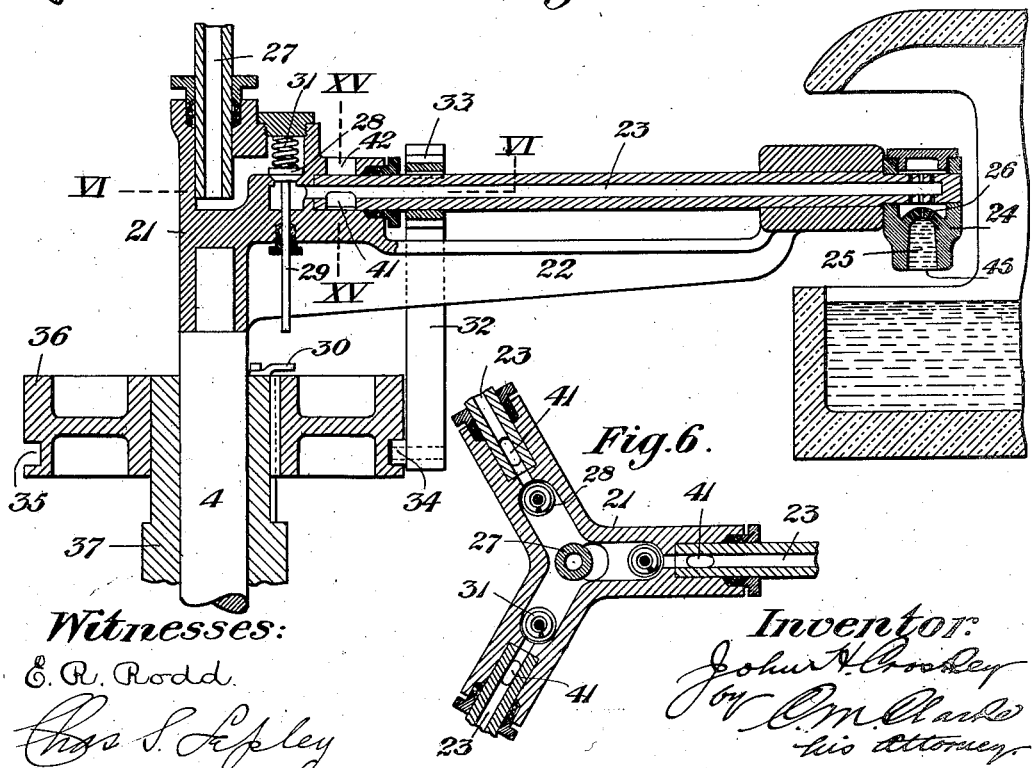
Fig. 5.
Fig. 6.

No. 881,096. PATENTED MAR. 3, 1908.
J. H. CROSKEY.
GLASS GATHERING APPARATUS.
APPLICATION FILED MAY 7, 1906.
4 SHEETS—SHEET 3.
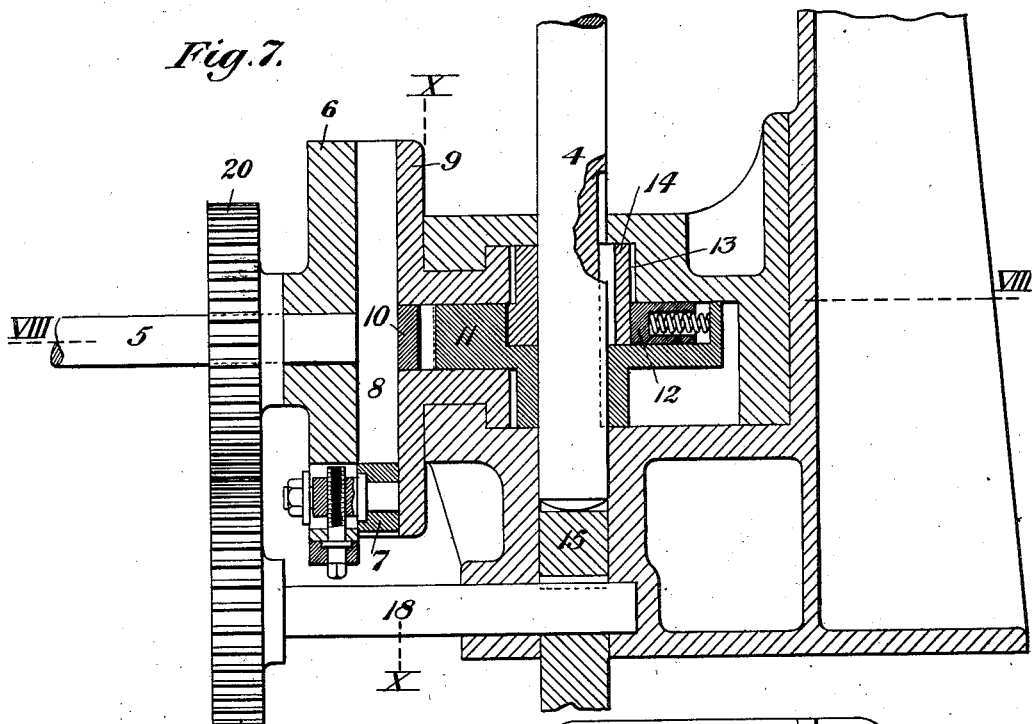
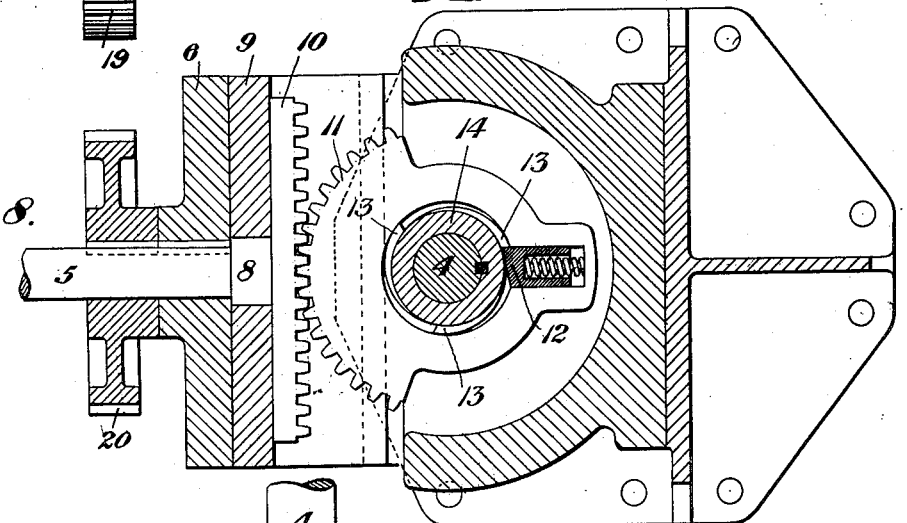
Witnesses:
E. R. Rodd
Chas. S. Lepley
Inventor:
John H. Croskey
by O. M. Clarke
his attorney No. 881,096.

J. H. CROSKEY.
GLASS GATHERING APPARATUS.
APPLICATION FILED MAY 7, 1906.

PATENTED MAR. 3, 1908.

4 SHEETS—SHEET 4.

Witnesses:
E. R. Rodd.
Chas. S. Lepley.

Inventor:
John H. Croskey
by O. M. Clarke
his attorney

UNITED STATES PATENT OFFICE.

JOHN H. CROSKEY, OF PITTSBURG, PENNSYLVANIA, ASSIGNOR TO DUQUESNE GLASS CO., OF PITTSBURG, PENNSYLVANIA, A CORPORATION OF PENNSYLVANIA.

GLASS-GATHERING APPARATUS.

No. 881,096.     Specification of Letters Patent.     Patented March 3, 1908.

Application filed May 7, 1906. Serial No. 315,468.

*To all whom it may concern:*

Be it known that I, JOHN H. CROSKEY, a citizen of the United States, residing at Pittsburg, in the county of Allegheny and State of Pennsylvania, have invented certain new and useful Improvements in Glass-Gathering Apparatus, of which the following is a specification, reference being had therein to the accompanying drawing.

My invention relates to the art of manufacturing glass ware, particularly pressed ware, and it has for its object to provide means for taking and removing a measured quantity of glass from a mass or batch of molten glass "metal", to transfer it to position over or in proper relation to a forming mold, to discharge said measured quantity into the mold, and to perform such functions continuously and uniformly during the operation of the apparatus.

In carrying out my invention I employ a measuring cup, adapted to receive in its interior a pre-determined amount of molten glass by the employment of suction; means for removing any surplus metal from the cup and positively limiting its contents; means for reversing the cup from downward to upward position; means for lowering and raising it into and out of the batch; means for swinging the cup laterally into delivering position with relation to the mold; means for discharging the contents thereinto by reversing the cup; and, if desired, means for facilitating such discharge by admitting air to the suction cavity.

In the accompanying drawings I have shown one form of apparatus adapted to perform the various functions necessary to carry out the different steps, and while such apparatus is adapted to give good results in practice, it will be readily understood that various other and different embodiments of the invention may be made by different mechanisms or constructions, and I do not therefore wish to be limited to the exact or approximate construction or machine illustrated and hereinafter described.

Figure 1:
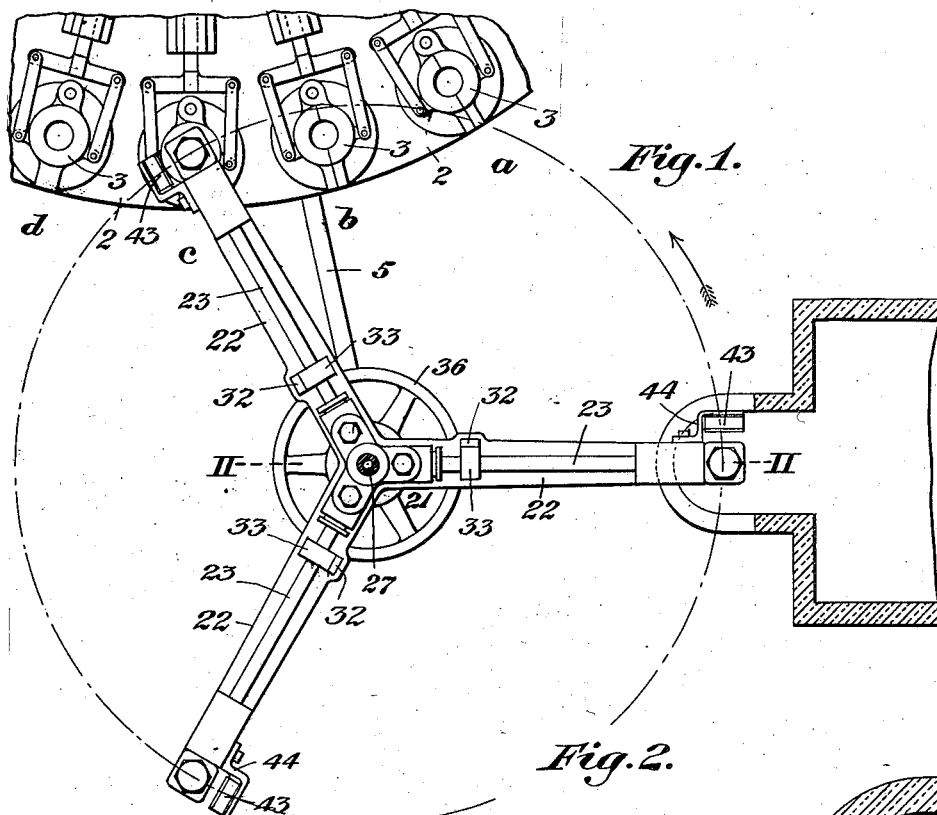
Figure 2:
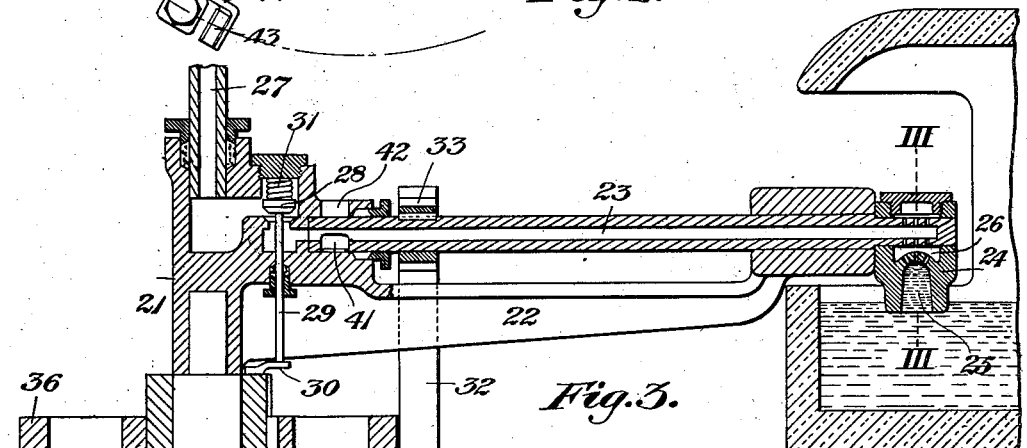
Figure 3:
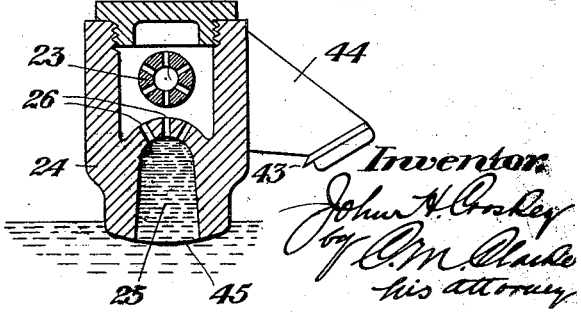
Figure 10:
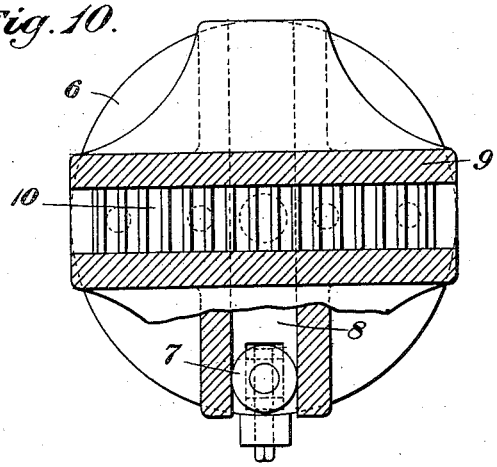
Figure 11:
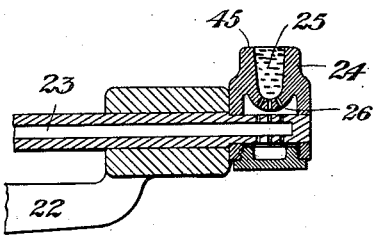
Figure 12:
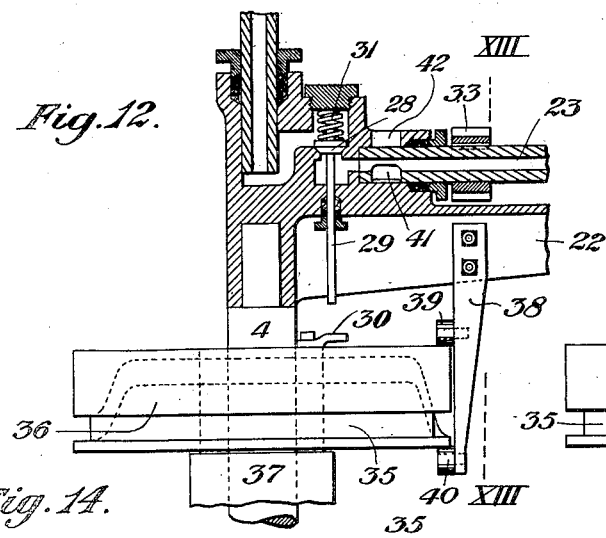
Figure 13:
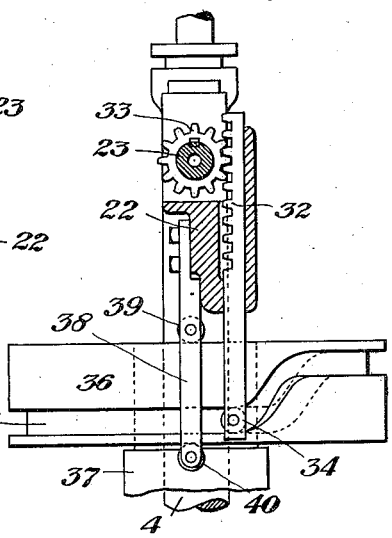
Figure 14:
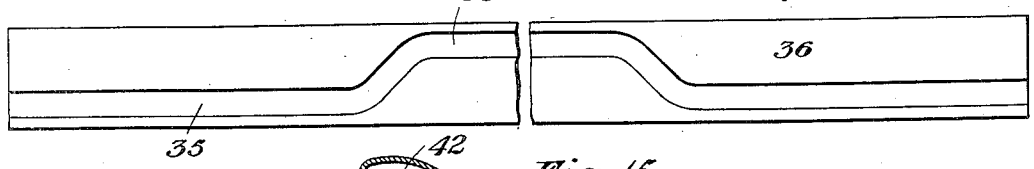
Figure 15:
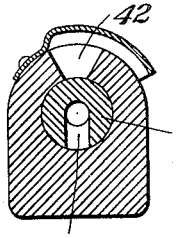

Referring now to the drawings: Figure 1. is a plan view showing a portion of a rotating mold-carrying table and molds thereon, with each of which molds my invention is adapted to coöperate. Fig. 2. is a vertical longitudinal sectional view indicated by the line II. II. of Fig. 1, on an enlarged scale, showing the cup lowered into the batch for filling. Fig. 3. is a cross sectional detail view on the line III. III. of Fig. 2, on a still larger scale. Fig. 4. is a view similar to Fig. 1 on an enlarged scale. Fig. 5. is a view similar to Fig. 2, showing the cup raised from the batch, ready to be rotated and swung around laterally to charging position. Fig. 6. is a horizontal detail sectional view indicated by the line VI. VI. of Fig. 5. Fig. 7. is a vertical sectional view of the mechanism for rotating the spindle of the cup-supporting structure. Fig. 8. is a horizontal sectional view on the line VIII. VIII. of Fig. 7. Fig. 9. is a face view of the spindle lifting cam. Fig. 10. is a vertical sectional detail view on the line X. X. of Fig. 7. Fig. 11. is a vertical sectional view of the cup in upright position. Fig. 12. is a partial sectional view similar to Fig. 2, illustrating means for vertically raising and lowering the cup spindle rotating cam. Fig. 13. is a similar view at right angles to Fig. 12, partially in section, indicated by the line XIII. XIII. of Fig. 12. Fig. 14. is a developed diagram of said cam. Fig. 15. is a cross sectional detail view on the line XV. XV. of Fig. 5.

I have illustrated the apparatus as used in combination with that type of glass pressing machinery shown in my prior application for patent Ser. No. 259,754 filed May 10, 1905, wherein an intermittently rotating table 2 provided with a circumferential series of molds 3 is constructed and arranged to bring each mold successively into stationary registering position with a compressing plunger, and at the same time into charging position for filling the mold.

My present invention involves the use of an intermittently rotating framework adapted or arranged to coöperate as to its motions with the motions of said table and molds, and comprises a central supporting spindle or shaft 4 adapted to be intermittently rotated. As shown, I actuate the spindle 4 by means of a shaft 5 geared in any suitable manner with the driving mechanism of the table 2, so that it will rotate the spindle 4 any pre-determined distance, as say one-third of a revolution, for each corresponding intermittent travel of the molds 3 from one position to another as from *a* to *b;* *b* to *c;* *c* to *d;* etc. Any convenient or suitable means may be employed to impart said motion intermittently to shaft 4, and in Figs. 7, 8 and 10 I have shown said shaft 5 (rotated in conformity with the mold travel) as provided with a crank disk 6 carrying a crank pin or roller 7 engaging a slot 8 of a reciprocating head 9. Said head 9 is provided with a rack 10 which gears into a segment 11 loosely mounted on shaft 4, and provided with a pawl 12 adapted to engage teeth 13 of a ratchet wheel 14 in sliding spline engagement with shaft 4, as clearly shown. By this construction it will be seen that for each rotation of shaft 5, spindle 4 will be rotated one-third of a revolution, corresponding to the desired distance of travel of the cup from the charging position to the emptying position, as clearly indicated in Fig. 1.
For the purpose of lowering and raising the measuring cup into the batch during the non-rotating period of shaft 4, I employ a cam 15 having a maximum and minimum radius 16, 17, upon the periphery of which the shaft 4 is stepped. Cam 15 is rotated in conformity with shaft 5 through shaft 18 and gearing 19, 20, whereby intermittent vertical motion will be imparted to shaft 4 and consequently to all of the cups simultaneously as stated.

21 is a cup-carrying frame mounted on the upper end of shaft 4 and provided with a plurality of, preferably 3, radial spider arms 22, each of which carries a rotatable hollow spindle 23 mounted in suitable bearings and carrying at its outer end a cup 24 having a cavity 25 of suitable size to contain the desired quantity of glass. As shown, the cup is provided with one or a series of small air ports 26 communicating with the interior of hollow spindle 23, said spindle being in communication with a central air exhaust pipe 27, as clearly shown in Figs. 5 and 6.

In Fig. 5 the cup is shown in a reversed position for being filled with glass, and upon spindle 4 being lowered the cup will be immersed into the bath as shown in Fig. 2, while a valve 28 controlling the suction circulation may be used and will be automatically opened by reason of its stem 29 coming into contact with a stationary stop 30, opening the valve and permitting the exhaust of air from the hollow spindle to cause atmospheric pressure on the surface of the glass to fill the cup. When spindle 4 is again raised by further rotation of cam 15, valve 28 will be closed by its spring 31, and spindle 4 will then be rotated, carrying the cup around to the discharging position over the mold as shown in Fig. 1. It is desirable that the cup should be reversed to an upright position during such swinging travel, and for such purpose I have provided a relatively movable rack bar 32 engaging pinion 33 on hollow spindle 23, the rack bar having a roller or abutment 34 engaging groove 35 of a cam 36. Said cam is slidingly mounted upon the stationary upper portion 37 of the supporting frame or base and in order that it may effect the independent travel of rack 32, I have shown it as being arranged to ride up and down with the vertical travel of spindle 4 and arms 22, for which purpose I employ pendent arms 38 having upper and lower rollers 39, 40, engaging above and below the cam as shown in Fig. 12 or any equivalent mechanism. By this construction it will be seen that the cam rises and falls with the rise and fall of the cup spindles and cups, but being splined upon its supporting frame, is non-rotatable, and will therefore effect the independent rack rotation of each spindle 23 at the proper time. Cam groove 35, as shown in the diagram of Fig. 14, is so designed as to effect the turning over of the cup immediately after it emerges upwardly from the bath, and commences to rotate, and the turning down of the cup immediately before it arrives at the charging position over the pressing mold.

In order to facilitate the discharge of the cupful of glass, I have provided means for admitting atmospheric pressure to the interior of spindle 23 and the cup so as to destroy the partial vacuum or suction, and have shown each spindle 23 as provided with a port 41, normally closed during the non-rotating reversed position of the cup, but adapted to register with an inlet port 42 opening to the atmosphere, immediately upon the cup being turned to upright position before the cup is turned over above the mold. The reëstablishment of atmospheric pressure in the interior of the hollow spindle and cup will, in combination with gravity, effect the complete discharge of the contents downwardly into the mold.

It will be understood that the cubical contents of the cup may be exactly regulated to the desired amount by the size of the cavity, and for the purpose of positively shearing off any surplus adhering glass, I have provided a stationary knife blade or edge 43 mounted in arm 44 and extending laterally from the terminal bearing of spider arm 22, while the edge 45 of the cup is curved to a uniform radius, as indicated in Fig. 3. By this construction, when the cup is rotated after filling and its contents retained by the effect of suction, any surplus glass will be sheared off, leaving an exactly measured quantity in the upwardly tilted cup.

It will be understood that the pipe 27 is connected with any suitable air exhausting apparatus, and that the degree of the partial vacuum produced in hollow spindles 23 and interior of the cups may be regulated to suit the existing conditions, as desired.

It will be understood that my gathering apparatus may be employed with any form of glass pressing mechanism, or in fact with any devices whatever wherein measured quantities of glass are desired to be delivered from time to time to a pressing or forming mold or apparatus of any character, irrespective of whether said mold is mounted upon a rotating table or otherwise; and also that any suitable actuating or driving means may be employed, not necessarily in combination with the driving mechanism of the glass pressing or forming apparatus.

In the construction illustrated in the drawings wherein my invention is designed to coöperate with an intermittently partially rotating mold carrying table, such correspondence of motion is desirable, but the adaptation of the invention to other mechanisms or apparatus is within the ordinary skill of the designing engineer or mechanic.

The operation is as follows:—The cup, or one of the cups 24, having been brought in reversed position, into register with the batch of glass contained in any suitable pot, tank extension, or receptacle, is then lowered into or upon the surface of the molten glass as in Fig. 2, whereupon the cup cavity will be filled by the effect of suction, the cup then being raised by cam-actuated spindle 4, leaving it free from the glass and edge of the receptacle, as in Fig. 5. The cup is then swung around laterally by rotation of spindle 4 as described, during the first portion of which motion the surplus glass is sheared off by knife 43 and the cup is turned upwardly to an upright position as in Fig. 11 by means of the cam-controlled rack and pinion mechanism, the normal atmospheric pressure within the spindle and interior of the cup having been reëstablished by register of the ports 41 and 42. Immediately before arriving at the discharging position over the mold the cup is reversed by the reversal of the cam groove 35, so that when the cup arrives at the end of its lateral swinging travel it will have been again reversed over the mold, into which the contents will be at once discharged. Such discharge will be facilitated as stated, by the equalization of the pressure in the interior of the spindle and cup, while the vertical drop of the cup due to cam 15, occurring simultaneously with the lowering of the next ensuing cup into the batch, will further facilitate such discharge. The emptied cup in its reversed position then travels around until it is again in position for filling from the batch, when the operation is continued and may be carried on indefinitely.

It will be understood that any number of spider arms, spindles and cups may be used and I do not wish to be limited to three, the operation with a single arm and cup being in all respects the same as has been described.

Having described my invention, what I claim is.

1. A glass gathering apparatus having a horizontal spindle provided with a rotatable measuring cup, and means for vertically raising and lowering the cup into and out of the glass.

2. A glass gathering apparatus provided with a hollow spindle having a measuring cup, means for vertically raising and lowering the cup into and out of the glass, and means for rotating the cup around the longitudinal center of the spindle.

3. A glass gathering apparatus having a horizontal spindle provided with a rotatable measuring cup, means for vertically raising and lowering the cup into and out of the glass, and means for exhausting air from the interior of the cup to create retaining suction therein.

4. A glass gathering apparatus provided with a hollow spindle having a measuring cup, means for vertically raising and lowering the cup into and out of the glass, means for rotating the cup around the longitudinal center of the spindle, and means for exhausting the air from the interior of the cup to create retaining suction therein.

5. A glass gathering apparatus provided with a horizontal swinging arm having a rotatable cup, and means for vertically raising and lowering the arm and cup from and towards the top surface of the glass.

6. A glass gathering apparatus for taking measured quantities of molten metal from the upper portion of a batch, consisting of a supporting frame, a rotatable cup, means for lowering the cup into the glass in inverted position, means for creating filling suction in the cup, means for raising the cup, and means for rotating it.

7. A glass gathering apparatus provided with a horizontal radially swinging hollow spindle carrying a measuring cup, means for exhausting the air from said spindle and cup, and means for rotating the cup.

8. A glass gathering apparatus provided with a horizontal radially swinging hollow spindle carrying a measuring cup, means for exhausting the air from said spindle and cup, and means for vertically raising and lowering the cup into and out of the glass.

9. A glass gathering apparatus provided with a horizontal radially swinging hollow spindle carrying a measuring cup, means for exhausting the air from said spindle and cup, means for raising and lowering the cup into and out of the glass, and means for turning the cup.

10. A glass gathering apparatus having a rotatable hollow spindle provided with a measuring cup, means for partially exhausting the air therefrom, and means for reëstablishing atmospheric pressure therein.

11. A glass gathering apparatus having a horizontal laterally swinging rotatable hollow spindle in communication with air exhausting mechanism, a measuring cup carried upon said spindle and provided with a cavity in communication therewith, and means for swinging, rotating, raising, and lowering the spindle and cup.

12. A glass gathering apparatus having a horizontal laterally swinging rotatable hollow spindle in communication with air exhausting mechanism, a measuring cup carried upon said spindle and provided with a cavity in communication therewith, and means for swinging, rotating, raising, and lowering the spindle and cup, said spindle having a port arranged to communicate with the atmosphere when the cup is turned to upright position.

13. A glass gathering apparatus having a laterally swinging rotatable hollow spindle in communication with air exhausting mechanism, a measuring cup carried upon said spindle and provided with a cavity in communication therewith, means for swinging and rotating the spindle, and means for reestablishing atmospheric pressure within the spindle and cup upon rotation of the spindle.

14. A glass gathering apparatus comprising a laterally swinging vertically movable hollow spindle provided with a measuring cup having apertures communicating with the hollow spindle, means for imparting vertical and lateral motion to said spindle and cup, and means for exhausting the air from the cup cavity to create a suction therein when the cup is in inverted position, and means for renewing the air when the cup is in upright position.

15. A glass gathering apparatus comprising a laterally swinging vertically movable rotatable hollow spindle provided with a measuring cup having apertures communicating with the hollow spindle, means for imparting vertical, lateral and rotatable motion to said spindle and cup, and means for exhausting the air from the cup cavity to create a suction therein when the cup is in inverted position, and means for renewing the air when the cup is in upright position.

16. The combination with a supporting arm provided with a shearing blade, of a rotatable cup mounted in said arm and having terminal edges arranged to rotate in shearing engagement with said blade, substantially as set forth.

17. The combination with a forming device and a source of supply, of a measuring cup, and means arranged to lower the cup in reversed position upon the glass in the source of supply, means for filling the cup, means for tipping it in either direction, and for moving it over the forming device to discharge its contents thereinto.

18. The combination with a forming device and a source of supply, of a measuring cup, and means arranged to lower the cup in reversed position upon the glass in the source of supply, means for exhausting the air from the cup to create filling suction therein, means for raising the cup, means for tipping it to upright position, means for swinging it around into position over the forming device, and means for emptying the contents of the cup into the forming device.

19. The combination with a forming device and a source of supply, of a measuring cup, and means arranged to lower the cup in reversed position upon the glass in the source of supply, means for exhausting the air from the cup to create filling suction therein, means for raising and rotating the cup, means for swinging it around into position over the forming device, means for reëstablishing atmospheric pressure in the interior of the cup, and means for again turning the cup to empty its contents into the forming device, substantially as set forth.

20. In a mechanical glass gatherer the combination with a revoluble table, of a plurality of tubular cup supports carried by said table, and each having a cup suspended therefrom, means for imparting an intermittent rotary motion to said table, means for moving said cup supports longitudinally, and mechanism for creating a suction through the tubular supports, and cups, and for cutting off such suction, and automatic mechanism for reversing the positions of said cups.

In testimony whereof I affix my signature in presence of two witneses.

JOHN H. CROSKEY.

Witnesses:
  CHAS. S. LEPLEY,
  C. M. CLARKE.